Sept. 8, 1953
O. S. FIELD
2,651,734
FREQUENCY GENERATOR
Filed Nov. 16, 1951
6 Sheets-Sheet 2
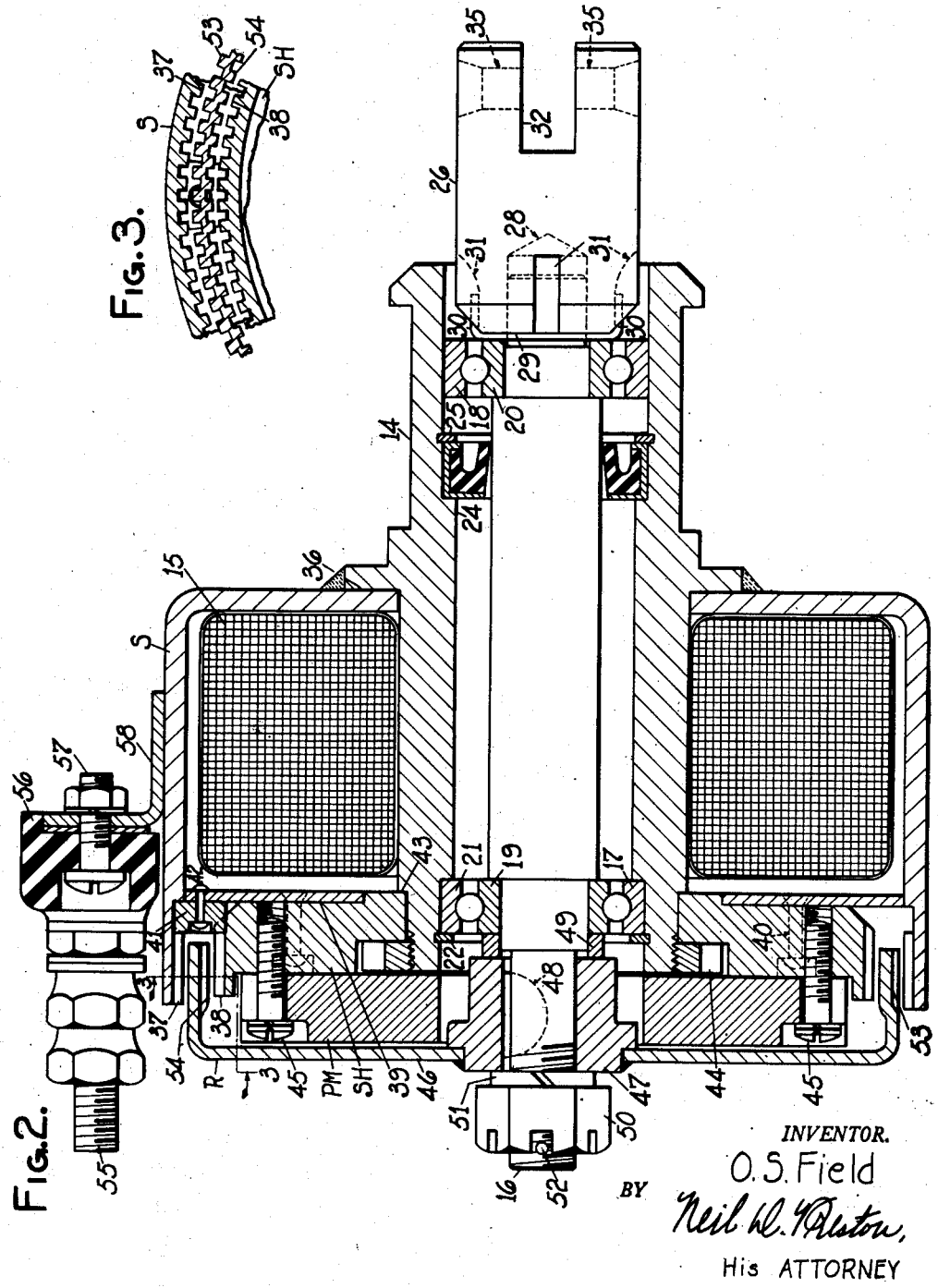
INVENTOR.
O. S. Field
BY Neil W. Preston,
His ATTORNEY

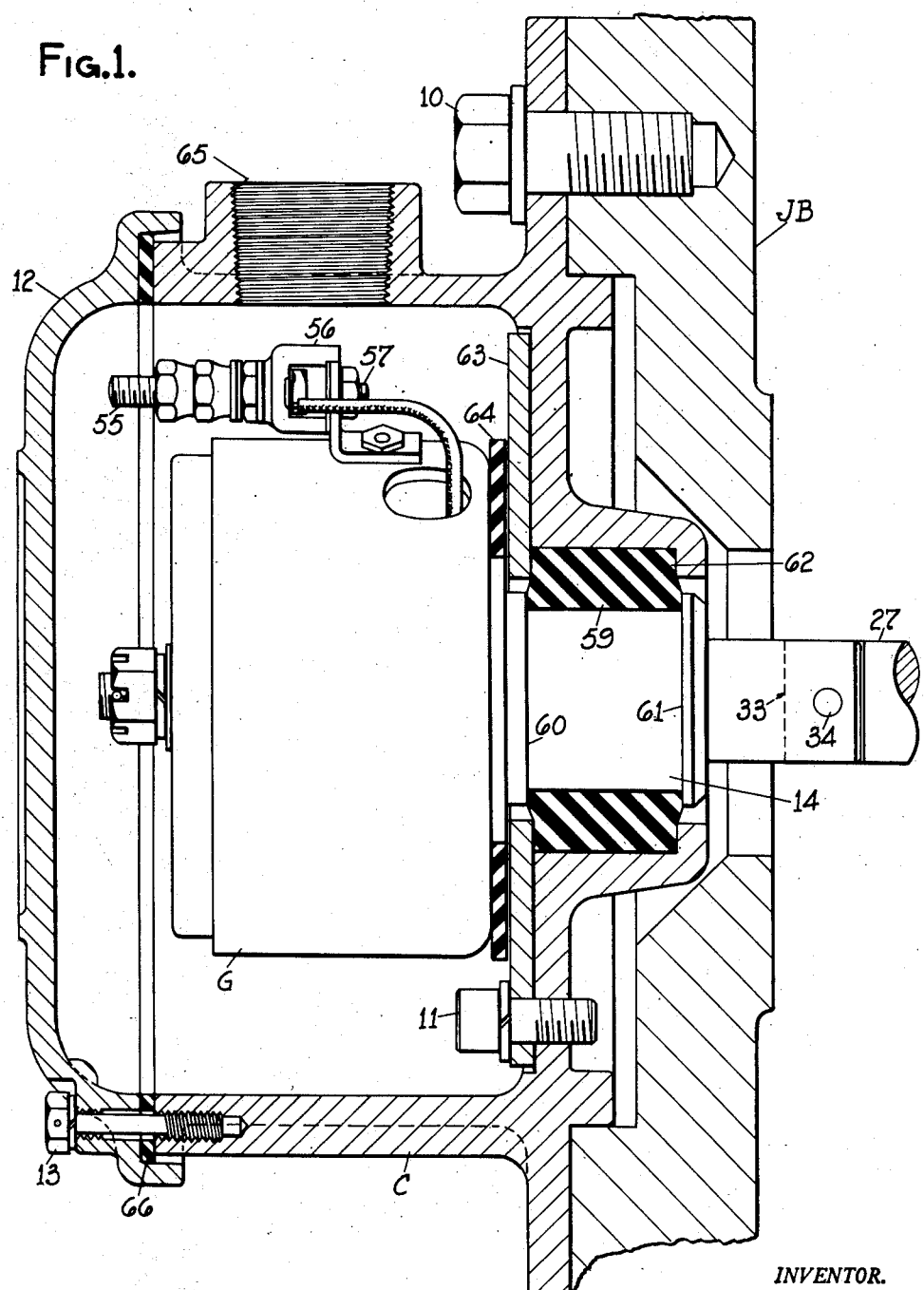

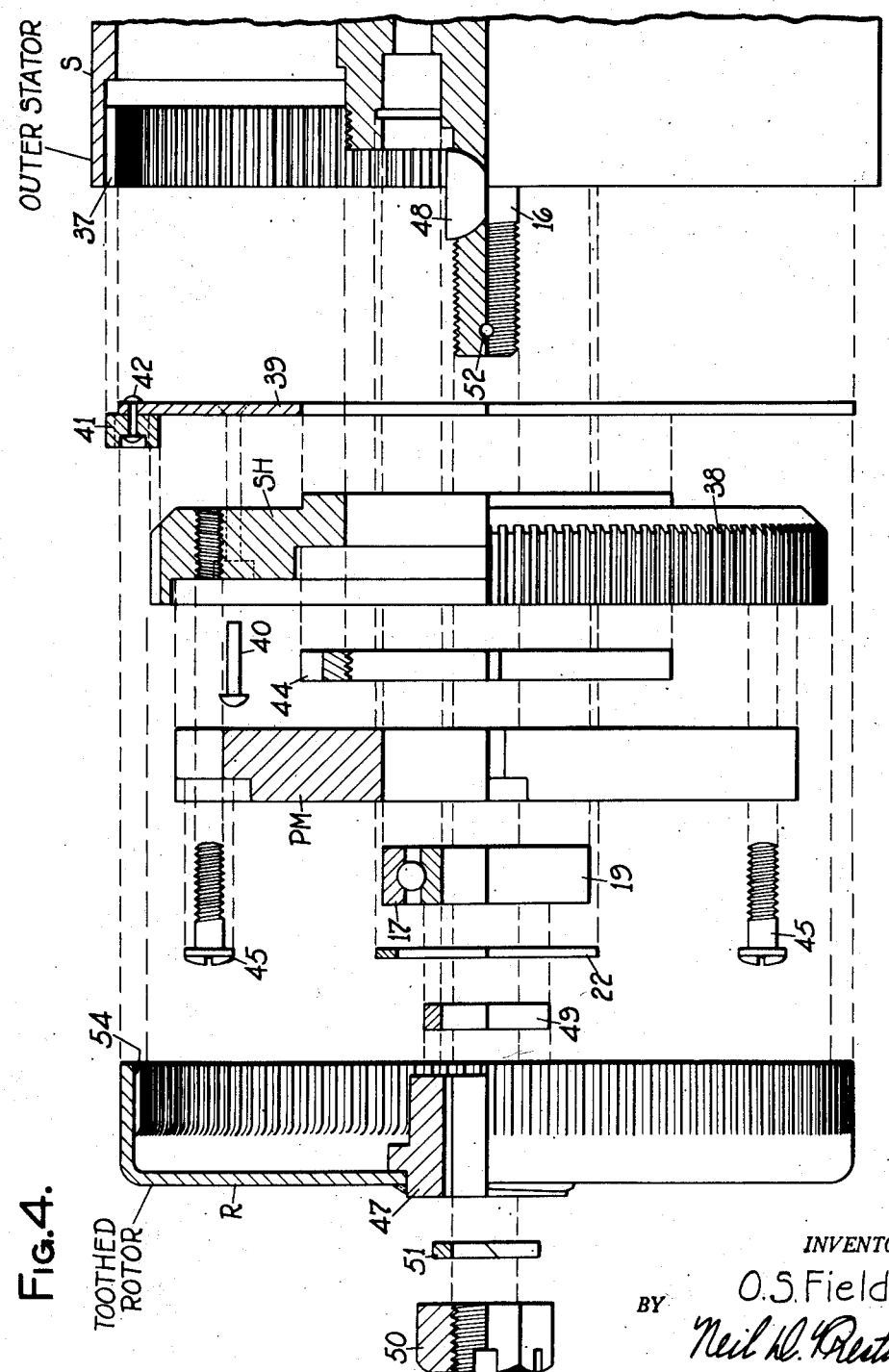

Sept. 8, 1953            O. S. FIELD            2,651,734
FREQUENCY GENERATOR
Filed Nov. 16, 1951            6 Sheets-Sheet 5
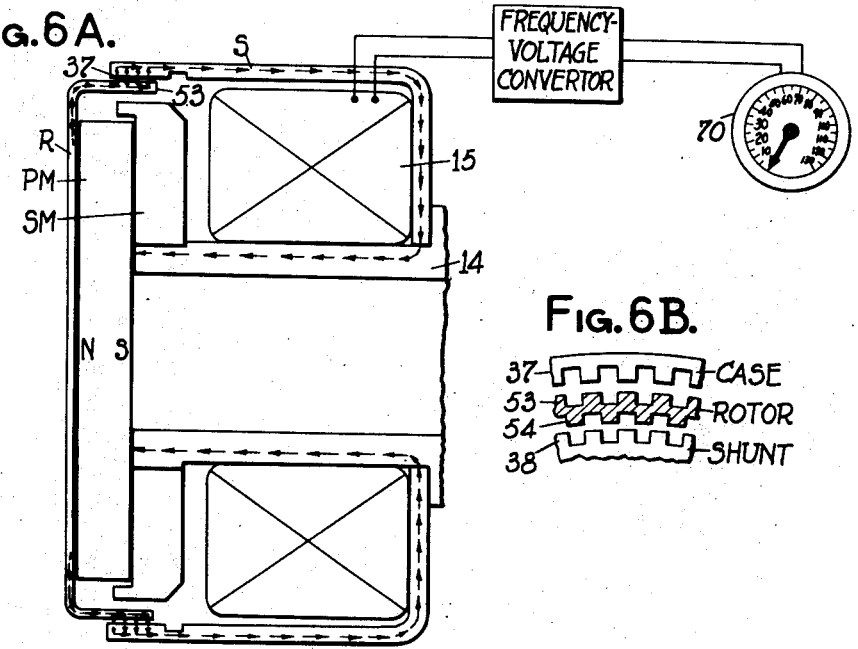
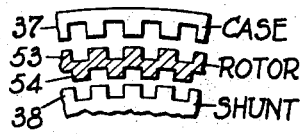
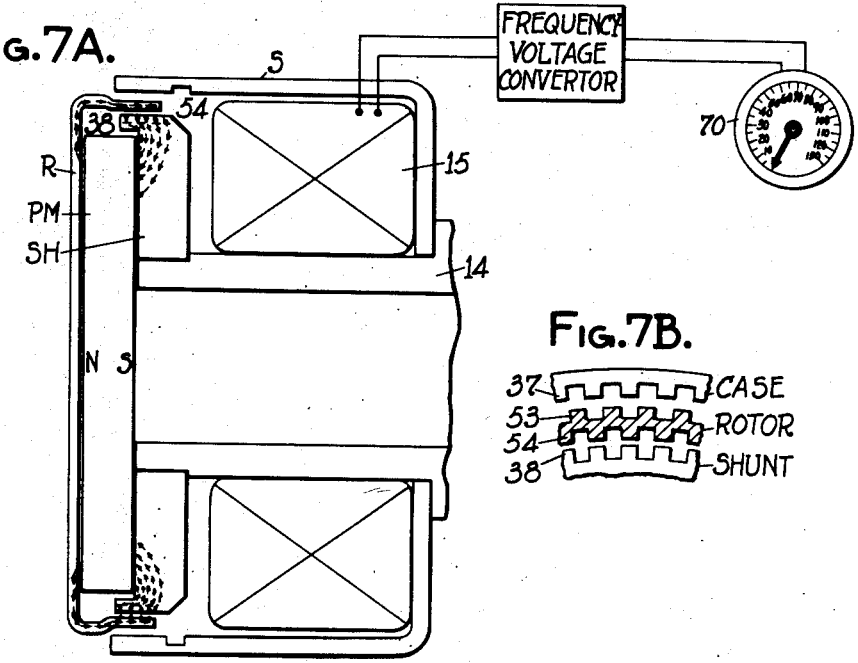
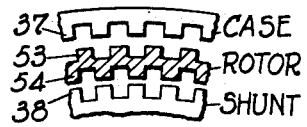
INVENTOR.
O. S. Field
BY
His ATTORNEY

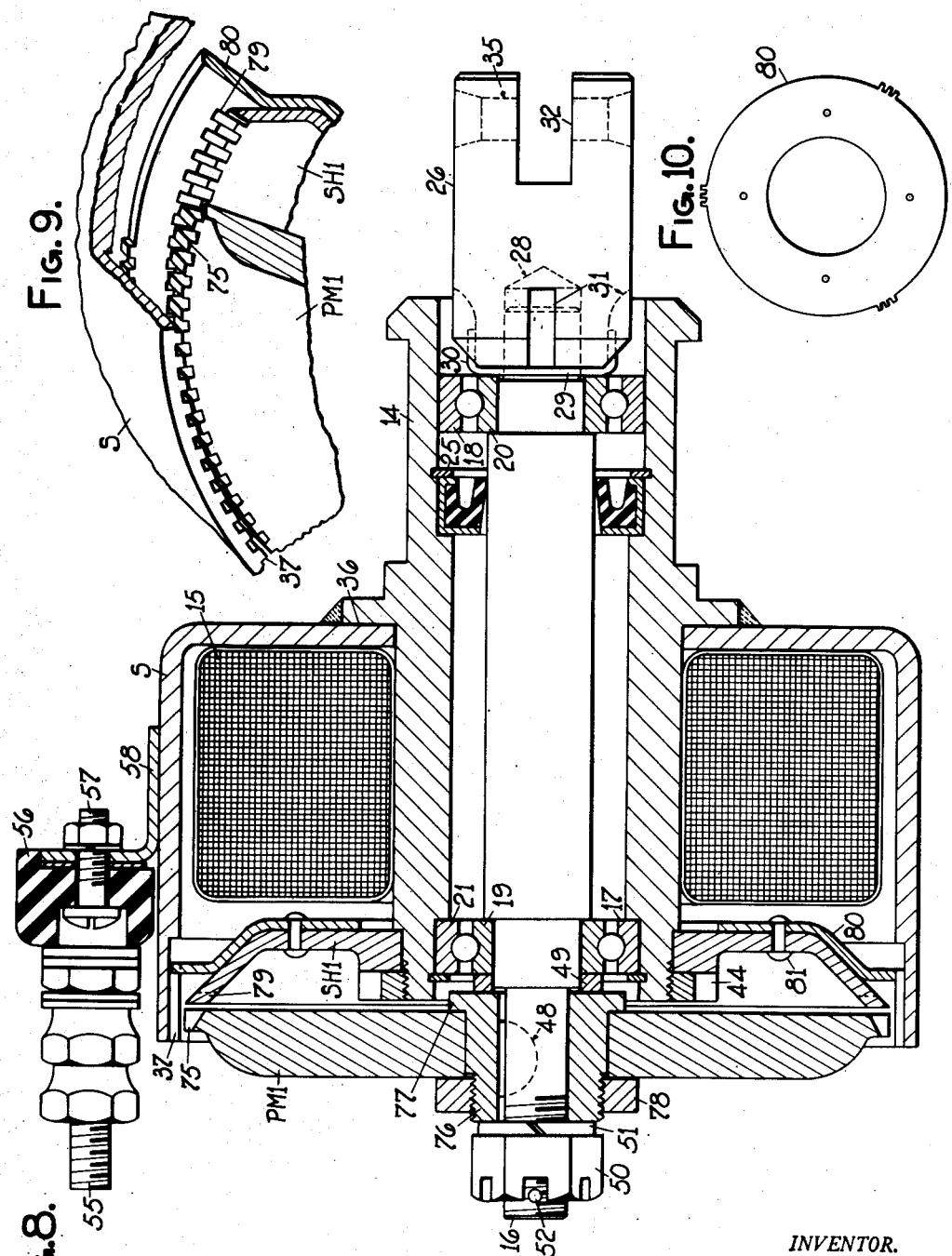

Patented Sept. 8, 1953

2,651,734

UNITED STATES PATENT OFFICE 2,651,734

FREQUENCY GENERATOR

Oscar S. Field, Rochester, N. Y., assignor to General Railway Signal Company, Rochester, N. Y.

Application November 16, 1951, Serial No. 256,634

7 Claims. (Cl. 310—169)

This invention relates to frequency generators, and it more particularly pertains to a generator having a toothed rotor and a toothed stator cooperating to furnish an output frequency varying directly with the speed of the rotor while the generated voltage, when applied to a substantially constant load, remains substantially constant over a wide range of speeds.

In railway practice it is desirable to obtain accurate indications as to the speed of a locomotive at a point on the locomotive remote from the wheel axle, and difficulties, such as vibration and the like, make it impractical to use a conventional speedometer chain connection from an axle to the speed indicator. By the present invention the speed indicator can be driven electrically with a high degree of accuracy. The generator according to the present invention also has utility in providing speed indication for train control purposes, such, for example, as in the train control system disclosed in the application of J. E. Freehafer, Ser. No. 256,628 filed of even date with the present application.

Generally speaking, and without attempting to define the scope of the present invention, the present invention comprises a generator for coupling directly to a locomotive axle, the generator having a frequency output variable directly with the speed of the locomotive, and maintaining a substantially constant voltage over a wide range of speeds when a substantially constant load is applied to the generator.

The generator structure comprises a magnetic rotor and stator, a magnetic shunt, and a permanent magnet for supplying the magnetic field. The rotor and stator and shunt have teeth cooperating to alternately form a magnetic generating circuit and a magnetic shunt circuit as the rotor is driven by the locomotive axle. By reason of use of the relatively large number of teeth, and the shunt magnetic circuit, it is possible to generate sufficient voltage for satisfactory operation of a speed indicator when the locomotive is moving at a very low speed, and as the speed of the locomotive increases, the increase in frequency is effective to offer a greater impedance in the load circuit, and thus maintain the output voltage under constant load conditions substantially constant.

An object of the present invention is to generate a frequency indicative of speed by the turning of a toothed rotor coupled to the axle of the locomotive, the rotor having two sets of teeth, one set of which cooperates with a particular set of stator teeth for varying the field cutting the winding of the generator, and the other set of rotor teeth cooperating with a set of teeth of the magnetic shunt for shunting out the generating magnetic field at times when the cooperating rotor and stator teeth are out of register opposite each other.

Another object of the present invention is to use a relatively large number of cooperating teeth on the rotor and stator as an efficient means for generating at low axle speeds.

Another object of the present invention is to use the output of the frequency generator to control a speed indicator or the like at a point on the locomotive remote from the axle.

Other objects, purposes, and characteristic features of the present invention will be in part obvious from the accompanying drawings, and in part pointed out as the description of the invention progresses.

In describing the invention in detail, reference is made to the accompanying drawings, in which corresponding parts are identified by similar reference characters throughout the different views; and in which:

Fig. 1 is an elevational view, shown partly in cross-section, of the frequency generator and its housing as it is attached to the hub of an axle of a locomotive;

Fig. 2 is an elevational sectional view of the frequency generator shown in Fig. 1;

Fig. 3 is a fragmentary sectional view of the cooperating teeth of the frequency generator shown in Fig. 2, taken along the section line 3—3 of Fig. 2;

Fig. 4 is an exploded elevational view, shown partly in cross-section, and with certain parts broken away, illustrating the cooperation of the respective toothed elements of the frequency generator shown in Fig. 1;

Figs. 6A and 6B illustrate diagrammatically how the generating flux is set up in the generating magnetic structure when the teeth of the cooperating elements are in alignment as illustrated in Fig. 6B;

Figs. 7A and 7B illustrate diagrammatically how the generating flux is shunted by the magnetic shunt when the teeth of the respective elements cooperate as is illustrated in Fig. 7B;

Fig. 8 is an elevational sectional view of a modified type of frequency generator wherein the rotor is a permanent magnet;

Fig. 9 is a fragmentary enlarged perspective view, particularly showing the arrangement of the teeth in the generator shown in Fig. 8; and, Fig. 10 is a plan view of a locking disc used in the generator shown in Fig. 8.

Figure 5:
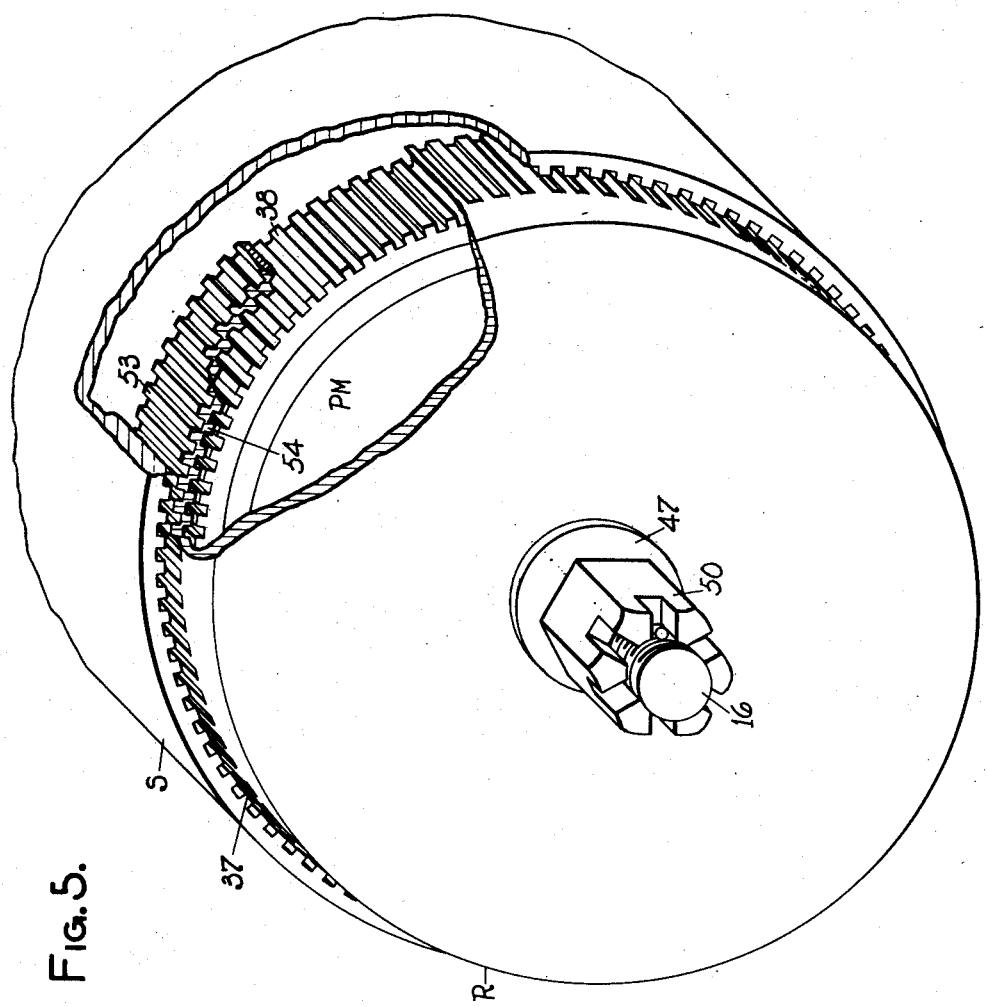
Fig. 5 is a view in perspective, of the cooperating rotor, stator, and magnetic shunt toothed elements of the generator shown in Fig. 1, illustrating particularly the cooperating relationship of the teeth of the respective elements.

With reference to Fig. 1, the general organization comprises a cylindrical case C suitably secured by bolts 10 to a conventional locomotive journal box JB, a generator G suitably secured within the case C by bolts 11, and a cover 12 for enclosing the generator G within the case C when fastened to the case C by bolts 13.

The generator G, according to Figs. 1 and 2, comprises a supporting sleeve 14, a drum-shaped stator S, a stator winding 15, a permanent magnet PM in the form of a disc, a magnetic shunt SH in the form of a disc and a rotor R.

A rotor shaft 16 extends through the center of the supporting sleeve 14 and is journaled by conventional radial ball bearings 17 and 18 near the respective ends of the shaft 16. The inner races of the ball bearings 17 and 18 bear against the respective shoulders 19 and 20 of the shaft 16, the outer race of the bearing 17 being secured in position against the shoulder 21 within the supporting sleeve 14 by a ring 22 fitted into a suitable slot formed in the sleeve 14. Between the two bearings, a rubber bushing in a sheet metal retainer is retained against the shoulder 24 within the supporting sleeve 14 by a suitable retainer ring 25 fitted into a slot formed in the supporting sleeve 14. This bushing blocks oil and grease from working through to the rotor R.

The right-hand end of the shaft as viewed in Fig. 2 is adapted to fastened in a coupling 26. This coupling serves as a coupling linkage for connection to a shaft 27 (see Fig. 1) which is driven directly by the rotation of the locomotive axle. Connection of the shaft 16 to the coupling 26 is made by the right-hand end of the shaft 16 being inserted in a hole 28 in the left-hand end of the coupling 26. The right-hand end of the shaft 16 has a key way, and the coupling of the shaft 16 to the coupling 26 is by a washer 29 having a suitable detent engaging the key way, and having four protruding ears 30 which lock in engagement with cooperating recesses 31 in the coupling 26 so as to cause the shaft 16 to be driven by rotation of the coupling 26, and permit end play within the joint between the shaft 16 and the coupling 26. The right-hand end of the coupling 26 has a longitudinal slot 32 for receiving the tongue 33 of the shaft 27 (see Fig. 1) which is in turn driven by the rotation of the locomotive axle, comparable to the connecting shaft 15 in the patent to H. B. Taylor, No. 2,457,748, dated December 28, 1948. Such tongue 33 is connected to the coupling 26 by a suitable pin or rivet 34 (see Fig. 1) extending through the holes 35 (see Fig. 2) of the coupling 26.

The drum-shaped stator S is constructed of magnetic material, and it is assembled over the supporting sleeve 14 and against the shoulder 36 of the sleeve 14 to which it is suitably secured, as by welding, concentric with the sleeve 14.

Teeth 37 are formed about the inner periphery of the stator S, at a point adjoining the left-hand edge of the stator drum as is illustrated in Fig. 2 for cooperating with a like number of teeth on the rotor R. Although the number and shape of the teeth may vary according to the requirements of practice, 128 substantially square teeth have been found to give satisfactory operation.

The stator winding 15 is receivable over the outer periphery of the sleeve 14 and within the stator S. It will be noted from the structure that has been described that a generating magnetic structure is set up having a magnetic circuit extending around three sides of the winding, namely across the outer circumference and right-hand side of the winding 15 as viewed in Fig. 2, and across the inner circumference of the winding through the sleeve 14.

The magnetic shunt disc SH has teeth 38 about its periphery conforming to the type and number of teeth used on the stator S. The magnetic shunt SH has a nonmagnetic disc plate 39 suitably secured thereto as by rivets 40, and this disc 39 carries a nonmagnetic locking block 41 which is secured thereto by a rivet 42. The locking block 41 has several teeth on opposite edges for cooperation in mesh with the teeth 37 and 38 of the stator S and the magnetic shunt SH respectively. These teeth of the locking block are formed directly opposite each other on opposite edges of the block so that when they are in mesh with the teeth 38 and 37 of the stator S and the shunt SH respectively, the teeth of the stator S and the shunt SH are positioned in correspondence opposite each other. The magnetic shunt disc SH is mounted on the supporting sleeve 14 against the shoulder 43, in which position it is held by a nut 44 which is threaded onto the left-hand end of the sleeve 14 as viewed in Fig. 2.

The circular permanent magnet PM is secured to the left-hand side of the magnetic shunt SH as viewed in Fig. 2 by screws 45, and it is magnetized with the left-hand and right-hand faces of the magnet, as viewed in Fig. 2, forming opposite poles. For most desirable operating characteristics, the degree of magnetization of the permanent magnet is such as not to saturate either the stator S or the shunt SH.

The rotor R is of magnetic material and is shaped in the form of a drum 46, open at the right-hand end, which is suitably secured, as by silver solder, onto a nonmagnetic hub 47. The hub 47 is keyed on the shaft 16 by the key 48, and the hub 47 is retained on the shaft 16 bearing against a spacer 49 by a nut 50 and lock washer 51, the nut 50 being threaded onto the left-hand end of the shaft 16 and being locked against rotation by a cotter key 52, or lock wiring, or the like. The spacer 49 is of such a thickness as to hold to a minimum clearance between adjoining inner and outer faces of the rotor R and the permanent magnet PM respectively. It will be noted that the permanent magnet PM is of considerably smaller diameter than the inner diameter of the rotor drum 46 so that the magnetic circuit between these elements will have its point of lowest reluctance through the above described adjoining surfaces.

Teeth 53 and 54 are formed about the respective outer and inner peripheries of the drum 46 of the rotor R, these teeth being comparable in character and in the number of teeth to cooperating teeth 37 and 38 of the respective stator S and the magnetic shunt SH. The teeth 53 and 54 of the outer and inner peripheries of the rotor respectively are, however, out of correspondence with each other so that the teeth 54 cooperating with the shunt SH, for example, are directly opposite radially the spaces between the teeth of the shunt SH when the teeth 53 are directly opposite radially the teeth 37 of the stator S. This condition is clearly illustrated in Fig. 3. The portion of the rotor drum 46 carrying the teeth is disposed between the teeth 37 and 38 of the stator S and the shunt SH respectively so that there is a minimum clearance between the cooperating sets of teeth, but yet permitting free rotation of the rotor R. Because of the teeth 53 and 54 of the rotor being staggered relative to each other, the rotor teeth 53 and 54 are in correspondence alternately with the teeth 37 of the stator S and the teeth 38 of the shunt SH respectively as the rotor R is rotated.

The electrical connections to the winding 15 are brought out to respective terminal posts 55 which are suitably secured to a terminal block 56 of insulating material, which in turn is secured by a screw 57 to a supporting bracket 58, the bracket 58 being secured to the outer periphery of the stator S.

The generator G is rubber mounted within the case C, there being a rubber bushing 59 retained between shoulders 60 and 61 of the outer periphery of the sleeve 14 of the generator G. The bushing 59 is fitted within a journal formed in the case C. Thus upon insertion of the generator carrying the bushing 59 within the case C, the bushing 59 extends within the journal in the right-hand side of the case C as viewed in Fig. 1 until it strikes the inner shoulder 62 of the case C.

The generator G is secured within the case C by a mounting plate 63 which is fitted freely over the right-hand end of the sleeve 14 prior to the insertion of the rubber bushing 59 onto the sleeve 14. Thus after insertion of the generator G within the case C, it is secured in operating position by the tightening of bolts 11 to draw the mounting plate 63 against the right-hand side of the case C as viewed in Fig. 1. This tightening operation compresses the rubber bushing 59 and thus completes the rubber mounting of the generator G within the case C in a position in alignment with the end of the locomotive axle. A rubber washer 64 is used between the starter S and the mounting plate 63 to further seal the inside of the case against grease, dust, and the like leaking through into the housing from the journal box of the locomotive.

Provision is made for wiring connections to the generator G by the threaded opening 65 at the top of the case C as viewed in Fig. 1 for receiving a conventional conduit fitting. Thus the wiring connections from the terminal posts 55 of the generator G can be readily fed through the conduit to respective remote points on the locomotive as required in practice. The cover of the case C is tightly sealed by use of a gasket 66.

It is to be understood that the generator G can be used in practically any train control or indicating system where a form of speed indication is required. For example, the generator G is illustrated in Fig. 6A as driving a dial speed indicator 70 through a suitable frequency-voltage converter. The conversion of frequency to voltage for driving the speed indicator 70 can be accomplished in any suitable manner as long as the frequency and voltage to which it is converted are respectively in direct proportion. A suitable converter for this proposal is disclosed, for example, in the January 1945 issue of "Electronics" magazine, pages 264 and 268, to which reference is to be made for detailed consideration relative to the construction of the frequency-voltage converter. The speed indicator 70 can be a suitable voltmeter having a dial marked with uniformly spaced divisions in miles per hour.

In describing the mode of operation of the generator G in governing the speed indicator 70, reference is made to Figs. 6 and 7, which illustrate respective generating and magnetic shunt conditions that are alternatively set up as the rotor R progresses from tooth to tooth in its rotation relative to the stator S and the shunt SH.

Fig. 6A shows a generating condition which is set up when the flux from the permanent magnet has a magnetic circuit of relatively low reluctance because the teeth 37 and 53 of the stator S and the rotor R are respectively in correspondence opposite each other. Thus the low reluctance magnetic field for the permanent magnet under this condition extends from the pole at the left-hand surface of the permanent magnet PM, through the drum of the rotor R, teeth 53 and 37 of the rotor drum and the stator S respectively, around the winding 15 and through the supporting sleeve 14, to the right-hand face of the permanent magnet as viewed in Fig. 6A. Upon the change in flux of this field, a generated voltage in the winding 15 is applied through the frequency-voltage converter to the speed indicator 70.

As the rotor R progresses in rotation so that the above mentioned teeth 53 and 37 of the rotor R and the stator S respectively are out of correspondence as is illustrated in Fig. 7B, the air gap between the out of correspondence teeth has become such as to make the generating magnetic circuit of higher reluctance; while teeth 54 and 38 of the rotor R and the shunt SH respectively are in correspondence to form a magnetic shunt circuit of relatively low reluctance as illustrated in Fig. 7A, so as to effectively rob the generating magnetic circuit of its flux so as to accentuate the change in the generating magnetic flux and thereby generate a voltage in the generator winding 15.

It will thus be seen from the above description, and upon comparing Figs. 6 and 7, that the relatively low reluctance generating and shunting magnetic circuits are set up alternately as the rotor R progresses from tooth to tooth in its rotation, and by using a relatively large number of teeth, the generator has a sufficient output to actuate the speed indicator 70 when the locomotive is operating at a speed as low as two miles per hour.

A second embodiment of the present invention is illustrated in Figs. 8, 9, and 10, wherein the rotor is a permanent magnet PM1. For convenience in facilitating the description, the same stator and shaft assembly has been used in the embodiment shown in Fig. 8 as has been fully described relative to the embodiment of Fig. 2, and corresponding parts of the two forms of the invention are identified by corresponding reference characters.

The permanent magnet rotor PM1 has substantially square teeth 75 formed about its periphery of a character and number to correspond with the teeth of the stator S, except that the teeth 75 of the permanent magnet PM are cut deep enough in the periphery of the permanent magnet so that their inside ends effectively form radial teeth which can cooperate with a magnetic shunting disc SH1 for purposes substantially comparable to the purposes that have been described relative to the use of the shunting disc SH of Fig. 2.

The permanent magnet rotor PM1 is carried on the shaft 16 of Fig. 8 by a suitable hub 76, which is preferably of nonmagnetic material such as brass, the hub 76 being keyed on the shaft 16 and retained on the shaft by the nut 50 and lock washer 51. The permanent magnet PMI is secured on the hub 76 between a shoulder 77 and a nut 78 which is threaded onto the hub 76.

The shunting disc SHI is of magnetic material such as silicon steel, and is cup-shaped so as to have a rim at its periphery in which radial teeth 79 are cut, these teeth being of a character to cooperate with the oppositely disposed ends of the teeth 75 about the periphery of the permanent magnet PMI.

The magnetic shunt disc SHI of Fig. 8 is secured on the sleeve 14 by a nut 44 in a manner corresponding to that which has been described for securing the shunt SH on the sleeve 14 in the embodiment disclosed in Fig. 2.

The radial alignment of the teeth 79 of the shunt SHI of Fig. 8 relative to the teeth 37 of the stator S is such that the respective teeth are out of correspondence with each other. The reason for this will be readily apparent with reference to Fig. 9, wherein it is illustrated that in order for the teeth of the shunt SHI and the stator S to be in correspondence with the teeth 75 of the permanent magnet alternately, they must be out of correspondence with each other. This out of correspondence condition is maintained by a locking disc 80 (see Fig. 10) of nonmagnetic material such as brass, which is secured by rivets 81 to the back side of the cup-shaped shunt SHI as is shown in Fig. 8. The locking disc 80 has several teeth at spaced points about its periphery as illustrated in Fig. 10 which mesh with the teeth 37 of the stator S so as to maintain the teeth 37 of the stator S out of correspondence with the teeth 79 of the magnetic shunt SHI.

Although the principle of operation of the generator according to Fig. 8 is somewhat the same as that which has been described for the generator according to Fig. 2, the permanent magnet rotor PMI of Fig. 8 is magnetized different from the permanent magnet PM of Fig. 2 in that it is magnetized with opposite poles at its periphery and center respectively. Thus the permanent magnet PMI becomes a series leg of the magnetic circuit extending through the stator S, including its teeth 37, around the winding 15, and through the sleeve 14. The construction of the cup-shaped magnetic shunt is such that points of minimum air gap between the magnetic shunt SHI and the permanent magnet PMI are at the periphery of the shunt and at its hub respectively, so that the shunt effectively bridges the respective poles of the permanent magnet PMI when its teeth cooperate with the ends of the teeth 75 of the permanent magnet PMI in forming a magnetic shunt circuit of low reluctance.

It is believed that it should be readily apparent from the description as set forth, that the mode of operation of the generator according to Fig. 8 follows the general principle of operation as is illustrated in Figs. 6 and 7 and as has been fully described in that the generating magnetic circuit and the shunt magnetic circuit are alternately effective as the shaft 16 is rotated by the locomotive axle so that the permanent magnet PMI progresses in rotation to form correspondence alternately with the stator S and the shunt SHI. The shunt SHI is obviously effective to rob flux from the generating magnetic circuit when its teeth 79 are in correspondence opposite the teeth 75 of the permanent magnet PMI, thus completing a low reluctance magnetic circuit between the opposite poles of the permanent magnet PMI, while the teeth 37 of the stator S are out of correspondence with the teeth 75 of the permanent magnet PMI.

Having thus described two specific embodiments of the present invention, it is desired to be understood that these forms have been described more particularly from the point of view of disclosure of the mode of operation and principles involved rather than to limit the scope of the present invention to the specific forms shown, and it is to be further understood that various alterations, adaptations, and modifications may be applied to the specific forms shown in accordance with the requirements of practice except as limited by the appending claims.

What I claim is:

1. A frequency generator comprising in combination, a rotor of magnetic material having teeth uniformly and continuously spaced about its periphery, a stator having a generating magnetic structure and a generating winding, said stator having continuous uniformly spaced teeth disposed opposite the respective teeth of the outer periphery of said rotor to magnetically cooperate therewith, and a fixed magnetic shunting disc having continuous uniformly spaced teeth about its periphery cooperating in correspondence with teeth of said rotor to shunt flux away from said generating magnetic structure at times when the teeth of said rotor and said generating magnetic structure are out of correspondence with each other.

2. A frequency generator comprising, a toothed stator, said stator having continuous uniformly spaced teeth disposed about its inner periphery and said stator having a generating winding in which a voltage is induced by changes in a magnetic circuit including said teeth, a magnetic shunt disc disposed within said stator, said magnetic shunt disc having continuous uniformly spaced teeth at its periphery, and a magnetic rotor having continuous uniformly spaced teeth about its periphery cooperating with the teeth of said stator and said shunting disc to alternately make up magnetic generating and shunting magnetic fields of minimum reluctance respectively.

3. A frequency generator comprising in combination, a toothed stator, said stator having continuous uniformly spaced teeth disposed about its inner periphery and said stator having a generating winding in which voltage is induced by changes in the flux of the magnetic circuit including said teeth, a magnetic shunting disc having continuous uniformly spaced teeth at its periphery, said magnetic shunting disc being disposed within said stator, and a magnetic rotor having continuous uniformly spaced teeth about its periphery cooperating with the teeth of said stator and the teeth of said shunting disc respectively.

4. A frequency generator comprising a rotor having first and second sets of continuous uniformly spaced teeth about its periphery, a stator having a winding and a generating magnetic structure with continuous uniformly spaced teeth about its inner periphery cooperating opposite said first set of teeth of said rotor, a permanent magnet providing flux for a magnetic circuit through the teeth of said rotor and said stator, and a shunting magnetic structure having continuous uniformly spaced teeth about its periphery cooperating with said second set of teeth of said rotor to shunt the flux of said permanent magnet away from said winding, said generating magnetic structure and said shunting magnetic structure having their teeth cooperating with said rotor alternately in circuits of lowest reluctance whereby a maximum change in the magnetic flux of the generating structure is obtained.

5. A frequency generator comprising, a rotor drum of magnetic material having continuous uniformly spaced teeth on both the outer and inner periphery of the drum, a stator having a generating magnetic structure and a winding, said stator having continuous uniformly spaced teeth spaced opposite the respective teeth of the outer periphery of said rotor to magnetically cooperate therewith, a permanent magnet fixed with respect to rotation and disposed within the drum of said rotor, a magnetic shunt adjoining said permanent magnet having continuous uniformly spaced teeth about its periphery spaced to cooperate magnetically with the teeth of the inner periphery of said rotor.

6. A frequency generator of the character described comprising in combination, a rotor drum of magnetic material having respective sets of continuous uniformly spaced teeth on both the inner and outer periphery of the drum, a stator having a winding and a generating magnetic structure with continuous uniformly spaced teeth cooperatively spaced opposite one of said sets of teeth of said rotor, a permanent magnet providing flux for a magnetic circuit through the teeth of said rotor and said stator, and a shunting magnetic structure having continuous uniformly spaced teeth cooperating with the other set of teeth of said rotor to shunt the flux of said permanent magnet away from said winding, said generating magnetic structure and said shunting magnetic structure having their teeth cooperating with said rotor in respective magnetic circuits of lowest reluctance alternately, whereby a maximum change in the magnetic flux of the generating structure is obtained upon rotation of the rotor from tooth to tooth.

7. A frequency generator comprising in combination, a toothed stator, said stator having continuous uniformly spaced teeth disposed about its inner periphery and said stator having a generating winding in which a voltage is induced by changes in the flux of a magnetic circuit including said teeth, a permanent magnet rotor disposed within said stator and having continuous uniformly spaced teeth about its periphery corresponding to and disposed opposite said teeth of the stator, a fixed shunting disc disposed within said stator having continuous uniformly spaced radial teeth disposed about its periphery corresponding to and opposite the ends of said teeth of said rotor, the teeth of said shunting disc being out of correspondence with the teeth of said rotor when said teeth of said stator are in correspondence with the teeth of said rotor, whereby there is maximum flux change in said magnetic circuit upon rotation of the rotor from tooth to tooth.

OSCAR S. FIELD.

References Cited in the file of this patent

UNITED STATES PATENTS

| Number | Name | Date |
|--------|------|------|
| 857,394 | Hallock | June 18, 1907 |
| 1,338,324 | Neuland | Apr. 27, 1920 |
| 2,500,730 | Yonkers | Mar. 14, 1950 |